United States Patent
Wang et al.

(10) Patent No.: US 10,107,995 B2
(45) Date of Patent: Oct. 23, 2018

(54) ZOOM LENS

(71) Applicant: Qingdao GoerTek Technology Co., Ltd., Qingdao (CN)

(72) Inventors: Yuanpeng Wang, Qingdao (CN); Chun Yang, Qingdao (CN)

(73) Assignee: Qingdao GoerTek Technology Co., Ltd., Qingdao (CN)

( * ) Notice: Subject to any disclaimer, the term of this patent is extended or adjusted under 35 U.S.C. 154(b) by 82 days.

(21) Appl. No.: 15/305,623

(22) PCT Filed: Jul. 30, 2015

(86) PCT No.: PCT/CN2015/085579
§ 371 (c)(1),
(2) Date: Oct. 20, 2016

(87) PCT Pub. No.: WO2016/019823
PCT Pub. Date: Feb. 11, 2016

(65) Prior Publication Data
US 2017/0038567 A1  Feb. 9, 2017

(30) Foreign Application Priority Data
Aug. 6, 2014 (CN) .......................... 2014 1 0384641

(51) Int. Cl.
*G02B 27/00* (2006.01)
*G02B 15/173* (2006.01)
(Continued)

(52) U.S. Cl.
CPC ........... *G02B 15/173* (2013.01); *G02B 5/005* (2013.01); *G02B 27/0025* (2013.01); *H04N 5/2254* (2013.01); *H04N 7/18* (2013.01)

(58) Field of Classification Search
CPC .. G02B 15/173; G02B 5/005; G02B 27/0025; H04N 5/2254; H04N 7/18
See application file for complete search history.

(56) References Cited

U.S. PATENT DOCUMENTS

| 5,757,554 A | 5/1998 | Fukami |
| 6,282,032 B1 | 8/2001 | Tomita |

(Continued)

FOREIGN PATENT DOCUMENTS

| CN | 101256268 B | 8/2011 |
| CN | 102707417 B | 11/2014 |

(Continued)

OTHER PUBLICATIONS

State Intellectual Property Office of the People's Republic of China, First Office Action in Chinese Application No. 201410384641.1 dated Feb. 1, 2016.

(Continued)

*Primary Examiner* — Ricky Mack
*Assistant Examiner* — Daniele Manikeu
(74) *Attorney, Agent, or Firm* — Lorenz & Kopf, LLP

(57) ABSTRACT

An optical system of the zoom lens comprises 20 pieces of lens whose surfaces are spherical surfaces and which are made of glass, and a fixed diaphragm. In the zoom lens, a front fixed group with a positive focal power, a zooming group with a negative focal power, a compensating group with a positive focal power, and a rear fixed group with a positive focal power are formed sequentially along a light incidence direction. Through reasonably arranging each element and selecting a proper material, the requirements of optical index of 50 times zooming ratio under focal distance of 750 mm to 15 mm and long focal distance of 350 mm are achieved, and this zoom lens can be used for confocal imaging in a visible light wave band and a near infrared wave band, so that it is applied in a day-and-night monitoring system.

9 Claims, 1 Drawing Sheet

(51) Int. Cl.
*G02B 5/00* (2006.01)
*H04N 5/225* (2006.01)
*H04N 7/18* (2006.01)

(56) References Cited

U.S. PATENT DOCUMENTS

| | | |
|---|---|---|
| 2007/0273980 A1 | 11/2007 | Horiuchi |
| 2008/0291546 A1 | 11/2008 | Kusaka |
| 2009/0034091 A1 | 2/2009 | Sakamoto |
| 2011/0122506 A1* | 5/2011 | Ito .................. G02B 15/173 359/683 |
| 2012/0026604 A1* | 2/2012 | Aoi .................. G02B 15/173 359/687 |
| 2013/0242166 A1* | 9/2013 | Hosoi ............... G02B 15/173 348/345 |
| 2014/0029112 A1 | 1/2014 | Sanjo |
| 2014/0313394 A1* | 10/2014 | Kim ................. G02B 15/173 348/345 |
| 2014/0355130 A1* | 12/2014 | Takemoto .......... G02B 15/16 359/684 |

FOREIGN PATENT DOCUMENTS

| | | |
|---|---|---|
| CN | 104199178 A | 12/2014 |
| CN | 204129320 U | 1/2015 |
| JP | 06242378 A | 9/1994 |
| JP | 2000121939 A | 4/2000 |
| JP | 2009086537 A | 4/2009 |

OTHER PUBLICATIONS

State Intellectual Property Office of the People's Republic of China action is ISA, International Search Report in International Application No. PCT/CN2015/085579, dated Feb. 11, 2016.

State Intellectual Property Office of the People's Republic of China action is ISA, Written Opinion of the International Authority for Application No. PCT/CN2015/085579, dated Feb. 11, 2016.

European Patent Office, Search Report of EP 15 829 940.4 dated Jul. 27, 2017.

* cited by examiner

| f  | 15     | 20     | 35     | 60     | 92    | 150    | 256    | 500    | 750    |
|----|--------|--------|--------|--------|-------|--------|--------|--------|--------|
| d1 | 3.34   | 25.44  | 59.88  | 84.55  | 99.55 | 112.85 | 125.26 | 133.11 | 137.31 |
| d2 | 207.84 | 183.45 | 143.69 | 112.63 | 91.49 | 69.78  | 49.03  | 19.27  | 1.00   |
| d3 | 0.77   | 3.07   | 8.39   | 14.78  | 20.92 | 29.33  | 37.67  | 59.57  | 73.65  |

ZOOM LENS

CROSS-REFERENCE TO RELATED APPLICATIONS

This application is a U.S. National-Stage entry under 35 U.S.C. § 371 based on International Application No. PCT/CN2015/085579 filed Jul. 30, 2015, which was published under PCT Article 21(2) and which claims priority to Chinese Application No. 201410384641.1 filed Aug. 6, 2014, which are all hereby incorporation in their entirety by reference.

TECHNICAL FIELD

This application pertains to an optical camera device involving video technology, and particularly to a zoom lens.

BACKGROUND

At present, a monitoring lens (namely, CCTV (Closed Circuit Television) Lens, namely, a lens for use in a closed circuit television) requires a rather large vision field width and requires a rather high resolution for a monitored object or person and day-and-night dual use function. However, the former two aspects conflict with each other because a system needs to have a very long focal distance to clearly distinguish details of the monitored subject. It is impossible to implement an optical system which has an extremely large vision field and a rather long focal distance at the same time. Therefore, zoom is introduced to meet the needs of the two aspects, i.e., a short focal distance is used to achieve a large vision field, and the short focal distance is shifted to a long focal distance when an object or person to be tracked and monitored is found, to obtain more information about details.

However, the current monitoring lens has problems such as a short focal distance and a low zooming ratio. In addition, other objects, desirable features and characteristics will become apparent from the subsequent summary and detailed description, and the appended claims, taken in conjunction with the accompanying drawings and this background.

SUMMARY

The present invention provides a zoom lens to solve problems of current zoom lenses such as a short focal distance and a low zooming ratio.

Embodiments of the present invention provide a zoom lens, comprising 20 pieces of lens and a diaphragm, in the zoom lens, a front fixed group with a positive focal power, a zooming group with a negative focal power, a compensating group with a positive focal power, and a rear fixed group with a positive focal power are formed sequentially along a light incidence direction. The front fixed group comprises in turn in the light incidence direction: a first lens which is a positive lens, a second lens which is a negative lens, a third lens which is a positive lens, a fourth lens which is a negative lens, a fifth lens which is a positive lens, a sixth lens which is a positive lens and a seventh lens which is a negative lens; the zooming group comprises in turn in the light incidence direction: an eighth lens which is a negative lens, a ninth lens which is a negative lens, a tenth lens which is a positive lens and an eleventh lens which is a positive lens; the compensating group comprises in turn in the light incidence direction: a twelfth lens which is a positive lens, a thirteenth lens which is a negative lens, a fourteenth lens which is a positive lens, a fifteenth lens which is a negative lens, and the diaphragm moving synchronously with the compensating group lenses; the rear fixed group comprises in turn in the light incidence direction: a sixteenth lens which is a negative lens, a seventeenth lens which is a positive lens, an eighteenth lens which is a positive lens, a nineteenth lens which is a negative lens and a twentieth lens which is a positive lens.

Embodiments of the present invention achieve the following advantageous effects: the present invention discloses a zoom lens. An optical system of the zoom lens comprises 20 pieces of lens whose surfaces are spherical surfaces and which are made of glass, and a fixed diaphragm. In the zoom lens, a front fixed group with a positive focal power, a zooming group with a negative focal power, a compensating group with a positive focal power, and a rear fixed group with a positive focal power are formed sequentially along a light incidence direction. The front fixed group corrects spherical aberration and chromatic aberration by employing a double glued structure and corrects the chromatic aberration and secondary spectrum by using a triple glued structure; the zooming group employs a negative-negative-positive structure and comprises a double glued structure to avoid over-correction of the aberration; the compensating group comprises a diaphragm with a high optical utilization rate and a triple glued structure, and can enable the chromatic aberration to be effectively controlled to achieve double-wave band confocal imaging. Through reasonably arranging each element and selecting a proper material, the requirements of optical index of 50 times zooming ratio under focal distance of 750 mm to 15 mm and long focal distance of 350 mm are achieved, and this zoom lens can be used for confocal imaging in a visible light wave band and a near infrared wave band, so that it is applied in a day-and-night dual-use monitoring system.

Other features and advantages of the present application will be illustrated in subsequent description, and are partly made apparent from the description, or understood by implementing the present application. Objects and other advantages of the present application will be implemented and obtained through structures specially specified in the description, claims and drawings.

BRIEF DESCRIPTION OF DRAWINGS

The present invention will hereinafter be described in conjunction with the following drawing figures, wherein like numerals denote like elements, and.

DETAILED DESCRIPTION

Figures 1, 2:
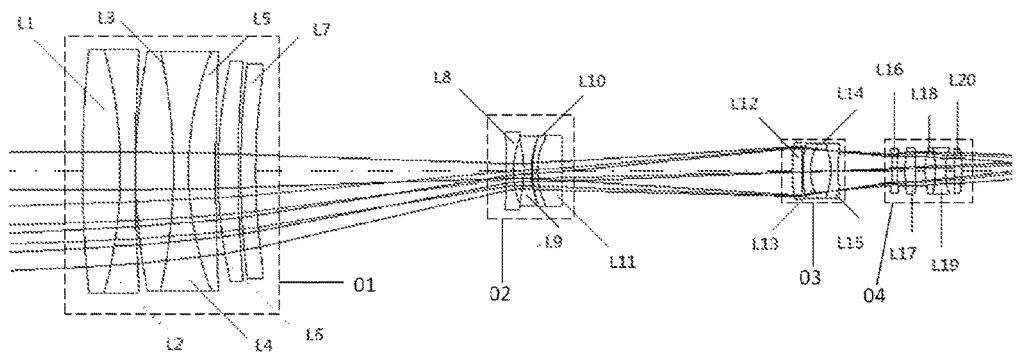
FIG. 1 is a structural schematic diagram of a zoom lens according to an embodiment of the present invention.
FIG. 2 is a schematic diagram showing changes of lens spacing while an optical system of a zoom lens performs zooming according to an embodiment of the present invention.

The following detailed description is merely exemplary in nature and is not intended to limit the invention or the application and uses of the invention. Furthermore, there is no intention to be bound by any theory presented in the preceding background of the invention or the following detailed description.

Embodiments of the present invention will be further described in detail with reference to figures to make objects, technical solutions and advantages of the present invention clearer.

In the present invention, four portions, namely, a front fixed group, a zooming group, a compensating group and a rear fixed group, constitute the zoom lens, wherein the zooming group moves forward and backward to change the focal distance, and the compensating group moves to compensate a change of a total length caused by the focal distance movement and ensures the total length of the system invariable;

When optical focal power of respective groups is designed, first the optical focal power of the respective groups are calculated and allocated according to a zooming formula, then an initial architecture is built by using an ideal surface, then first boundary conditions of focal distance and barrel length are added to optimize the initial architecture so as to determine distribution of optical focal power of respective groups.

The front fixed group comprises: a double glued structure employing a positive lens and a negative lens, and thereafter a triple glued structure comprised of two positive lenses and a negative lens, and then thereafter two single lenses. Furthermore, the positive lens in the double glued structure employs a ZK-series glass, and the negative lens employs N-KZFS-series glass to correct spherical aberration and chromatic aberration. The two positive lenses in the triple glued structure employ PK (phosphate crown glass) and ZBAF-series glass, and the negative lens employs N-KZFS-series glass to correct the chromatic aberration and secondary spectrum;

An initial structure of the zooming group employs a negative-negative-positive structure. During the design, depending on complexity of specific situations, the negative lens employs a lens having a high refractive index and a high Abbe number to avoid over-correction of the aberration;

The compensating group comprises a diaphragm. This portion exhibits a high utilization rate of light and is a crucial position for correcting the spherical aberration, so it employs a material having a high refractive index and a high Abbe number;

Since the light vision field and aperture incident on the rear fixed group are both not too large, the rear fixed group employs a Cooke three-piece structure as an initial structure and gets complicated depending on specific situation during design.

Based on the above design idea, the present invention provides a zoom lens. FIG. 1 is a structural schematic diagram of a zoom lens according to an embodiment of the present invention. An optical system of the zoom lens comprises 20 pieces of lens whose surfaces are spherical surfaces and which are made of glass, and a diaphragm. A front fixed group 01 with a positive focal power, a zooming group 02 with a negative focal power, a compensating group 03 with a positive focal power, and a rear fixed group 04 with a positive focal power are formed sequentially along a light incidence direction.

The front fixed group 01 comprises in turn in the light incidence direction:

A first lens L1, which is a positive lens and has a first surface convex towards an object direction and a second surface convex towards an image direction, wherein the second surface is a glued surface.

Preferably, a refractive index and chromatic dispersion of the first lens L1 are respectively in the following ranges: $1.45<n_1<1.70$, and $50<v_1<75$;

Preferably, the first lens L1 employs a glass material of ZK9 model.

A second lens L2, which is a negative lens and has a second glued surface concave towards an object direction and a third surface convex towards an image direction.

Preferably, a refractive index and chromatic dispersion of the second lens L2 are respectively in the following ranges: $1.45<n_2<1.75$ and $30<v_2<50$;

Preferably, the second lens L2 employs a glass material of N-KZFS11 model.

A third lens L3, which is a positive lens and has a fourth surface convex towards an object direction and a fifth surface convex towards the image direction, wherein the fifth surface is a glued surface.

Preferably, a refractive index and chromatic dispersion of the third lens L3 are respectively in the following ranges: $1.55<n_3<1.70$ and $40<v_3<65$;

Preferably, the third positive lens L3 employs a glass material of H-ZPK1 model.

A fourth lens L4, which is a negative lens and has a fifth surface concave towards the object direction and a sixth surface concave towards the image direction, wherein the sixth surface is a glued surface.

Preferably, a refractive index and chromatic dispersion of the fourth lens L4 are respectively in the following ranges: $1.60<n_4<1.70$ and $20<v_4<45$;

Preferably, the fourth lens L4 employs a glass material of N-KZFS11 model.

A fifth lens L5, which is a positive lens and has a sixth surface convex towards the object direction and a seventh surface concave towards the image direction.

Preferably, a refractive index and chromatic dispersion of the fifth lens L5 are respectively in the following ranges: $1.55<n_5<1.75$ and $30<v_5<50$;

Preferably, the fifth lens L5 employs a glass material of H-ZBAF5 model.

A sixth lens L6, which is a positive lens and has an eighth surface convex towards the object direction and a ninth surface convex towards the image direction.

Preferably, a refractive index and chromatic dispersion of the sixth lens L6 are respectively in the following ranges: $1.50<n_6<1.75$ and $35<v_6<50$;

Preferably, the sixth lens L6 employs a glass material of H-LAF3 model.

A seventh lens L7, which is a negative lens and has a tenth surface convex towards the object direction and an eleventh surface concave towards the image direction.

Preferably, a refractive index and chromatic dispersion of the seventh lens L7 are respectively in the following ranges: $1.65<n_7<1.80$ and $20<v_7<40$;

Preferably, the seventh lens L7 employs a glass material of ZF11 model.

It needs to be appreciated that the first lens L1 and the second lens L2 constitute a first double glued structure, and the third lens L3, the fourth lens L4 and the fifth lens L5 constitute a first triple glued structure.

The zooming group 02 comprises in turn in the light incidence direction:

An eighth lens L8, which is a negative lens and has a twelfth surface convex towards the object direction and a thirteenth surface concave towards the image direction.

Preferably, a refractive index and chromatic dispersion of the eighth lens L8 are respectively in the following ranges: $1.60<n_8<1.75$ and $45<v_8<60$;

Preferably, the eighth lens L8 employs a glass material of H-LAK67 model.

A ninth lens L9, which is a negative lens and has a fourteenth surface concave towards the object direction and a fifteenth surface concave towards the image direction.

Preferably, a refractive index and chromatic dispersion of the ninth lens L9 are respectively in the following ranges: $1.60<n_9<1.75$ and $45<v_9<60$;

Preferably, the ninth lens L9 employs a glass material of H-LAK67 model.

A tenth lens L10, which is a positive lens and has a sixteenth surface convex towards the object direction and a seventeenth surface concave towards the image direction, wherein the seventeenth surface is a glued surface.

Preferably, a refractive index and chromatic dispersion of the tenth lens L10 are respectively in the following ranges: $1.45<n_{10}<1.60$ and $50<v_{10}<75$;

Preferably, the tenth lens L10 employs a glass material of H-K51 model.

An eleventh lens L11 which is a positive lens and has a seventeenth surface convex towards the object direction and an eighteenth surface convex towards the image direction.

Preferably, a refractive index and chromatic dispersion of the eleventh lens L11 are respectively in the following ranges: $1.65<n_{11}<1.80$ and $20<v_{11}<35$;

Preferably, the eleventh lens L11 employs a glass material of H-ZF5 model.

It needs to be appreciated that the tenth lens L10 and the eleventh lens L11 constitute a second double glued structure.

The compensating group 03 comprises in turn in the light incidence direction:

A twelfth lens L12, which is a positive lens and has a nineteenth surface convex towards the object direction and a twentieth surface convex towards the image direction.

Preferably, a refractive index and chromatic dispersion of the twelfth lens L12 are respectively in the following ranges: $1.65<n_{12}<1.80$ and $25<v_{12}<45$;

Preferably, the twelfth lens L12 employs a glass material of H-LAF3 model.

A thirteenth lens L13, which is a negative lens and has a twenty-first surface convex towards the object direction and a twenty-second surface concave towards the image direction.

Preferably, a refractive index and chromatic dispersion of the thirteenth lens L13 are respectively in the following ranges: $1.65<n_{13}<1.80$ and $30<v_{13}<50$;

Preferably, the thirteenth lens L13 employs a glass material of H-LAF62 model.

A fourteenth lens L14, which is a positive lens and has a twenty-second surface convex towards the object direction and a twenty-third surface convex towards the image direction, wherein the twenty-third surface is a glued surface.

Preferably, a refractive index and chromatic dispersion of the fourteenth lens L14 are respectively in the following ranges: $1.55<n_{14}<1.70$ and $50<v_{14}<70$;

Preferably, the fourteenth lens L14 employs a glass material of H-ZPK1 model.

A fifteenth lens L15, which is a negative lens and has a twenty-third surface concave towards the object direction and a twenty-fourth surface convex towards the image direction.

Preferably, a refractive index and chromatic dispersion of the fifteenth lens L15 are respectively in the following ranges: $1.50<n_{15}<1.70$ and $30<v_{15}<50$;

Preferably, the fifteenth lens L15 employs a glass material of N-KZFS11 model.

The diaphragm moves synchronously with the lens of the compensating group 03, and the diaphragm surface constitutes a twenty-fifth surface.

It needs to be appreciated that the thirteenth lens L13, the fourteenth lens L14 and the fifteenth lens L15 constitute a second triple glued structure.

The rear fixed group 04 comprises in turn in the light incidence direction:

A sixteenth lens L16, which is a negative lens and has a twenty-sixth surface concave towards the object direction and a twenty-seventh surface concave towards the image direction.

Preferably, a refractive index and chromatic dispersion of the sixteenth lens L16 are respectively in the following ranges: $1.65<n_{16}<1.80$ and $50<v_{16}<60$;

Preferably, the sixteenth lens L16 employs a glass material of H-LAK67 model.

A seventeenth lens L17, which is a positive lens and has a twenty-eighth surface convex towards the object direction and a twenty-ninth surface convex towards the image direction.

Preferably, a refractive index and chromatic dispersion of the seventeenth lens L17 are respectively in the following ranges: $1.50<n_{17}<1.70$ and $30<v_{17}<55$;

Preferably, the seventeenth lens L17 employs a glass material of BAF3 model.

A eighteenth lens L18, which is a positive lens and has a thirtieth surface convex towards the object direction and a thirty-first surface convex towards the image direction.

Preferably, a refractive index and chromatic dispersion of the eighteenth lens L18 are respectively in the following ranges: $1.60<n_{18}<1.70$ and $35<v_{18}<50$;

Preferably, the eighteenth lens L18 employs a glass material of BAF4 model.

A nineteenth lens L19, which is a negative lens and has a thirty-second surface concave towards the object direction and a thirty-third surface concave towards the image direction.

Preferably, a refractive index and chromatic dispersion of the nineteenth lens L19 are respectively in the following ranges: $1.55<n_{19}<1.70$ and $30<v_{19}<50$;

Preferably, the nineteenth lens L19 employs a glass material of N-KZFS11 model.

A twentieth lens L20, which is a positive lens and has a thirty-fourth surface convex towards the object direction and a thirty-fifth surface convex towards the image direction.

Preferably, a refractive index and chromatic dispersion of the twentieth lens L20 are respectively in the following ranges: $1.45<n_{20}<1.60$ and $60<v_{20}<80$;

Preferably, the twentieth lens L20 employs a glass material of H-K9L model.

Furthermore, the optical system of the zoom lens is a continuous zooming system, a total length from the first surface of the first positive lens L1 to the second surface of the twentieth lens L20 is 350 mm, and the total length does not change under any focal distance.

Preferably, as shown in FIG. 2, FIG. 2 is a schematic view showing changes of a spacing d1 between the seventh and eighth lenses, a spacing d2 between the eleventh and twelfth lenses and a spacing d3 between the fifteenth and sixteenth lens in the optical system during zooming. A range of change of a spacing between the front fixed group 01 and the zooming group 02 is 3.34 mm-137.31 mm; a range of change of a spacing between the zooming group 02 and the compensating group 03 is 207.84 mm-1 mm; a range of change of a spacing between the compensating group 03 and the rear fixed group 04 is 0.77 mm-73.65 mm.

Specifically, when the focal distance of the optical system is 750 mm, a distance between the front fixed group and the zooming group is 137.31 mm, a distance between the zooming group and the compensating group is 1 mm, and a distance between the compensating group and the rear fixed group is 73.65 mm; when the focal distance of the optical system is 15 mm, a distance between the front fixed group and the zooming group is 3.34 mm, a distance between the zooming group and the compensating group is 207.84 mm, and a distance between the compensating group and the rear fixed group is 0.77 mm.

Furthermore, a back focal length in the optical system of the zoom lens is greater than 50 mm, and a filter is placed in the back focal length.

In practical application, thickness, position and film system of the filter are set according to specific requirement of project.

It should be noted that a total length of the optical system is less than 410 mm, and the total length of the optical system does not change under any focal distance.

In the present embodiment, the optical system comprised of 20 pieces of lens whose surfaces are spherical surfaces and which are made of glass, and a diaphragm, reaches the following technical indices:

Achieving 50-times zooming in a range of 750 mm-15 mm of the focal distance f;

Achieving confocal imaging of visible light (RGB wave band 486 nm-656 nm) and near infrared wave band in a range of 800 nm-950 nm;

A F number change range of the lens is 4.78-10.54, wherein the F number is 4.78 when the focal distance is 15 mm, and the F number is 10.54 when the focal distance is 750 mm;

A range of the vision field angle is from 35° to 0.7°, wherein the vision field angle is 35° when the focal distance is 15 mm, and the vision field angle is 0.7° when the focal distance is 750 mm;

A 1/1.8 inch detector may be used as an image surface;

Under any focal distance, the system achieves a quite high MTF value at 120 lp/mm under visible light wave band, and achieves a quite high MTF value at 80 lp/mm under near infrared wave band.

To conclude, the present invention discloses a zoom lens. An optical system of the zoom lens comprises 20 pieces of lens whose surfaces are spherical surfaces and which are made of glass, and a diaphragm. In the zoom lens, a front fixed group with a positive focal power, a zooming group with a negative focal power, a compensating group with a positive focal power, and a rear fixed group with a positive focal power are formed sequentially along a light incidence direction. The front fixed group corrects spherical aberration and chromatic aberration by employing a double glued structure and corrects the chromatic aberration and secondary spectrum by using a triple glued structure; the zooming group employs a negative-negative-positive structure and comprises a double glued structure to avoid over-correction of the aberration; the compensating group comprises a diaphragm with a high optical utilization rate and a triple glued structure, and can enable the chromatic aberration to be effectively controlled to achieve double-wave band confocal imaging. Through reasonably arranging each element and selecting a proper material, the requirements of optical index of 50 times zooming ratio under focal distance of 750 mm to 15 mm and long focal distance of 350 mm are achieved, and this zoom lens can be used for confocal imaging in a visible light wave band and a near infrared wave band, so that it is applied in a day-and-night dual-use monitoring system.

The above-mentioned are only preferred embodiments of the present invention and not intended to limit the protection scope of the present invention. Any modifications, equivalent substitutions and improvements made within the spirit and principle of the present invention are all included in the protection scope of the present invention.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A zoom lens, wherein the zoom lens comprises 20 pieces of lens and a diaphragm, and wherein a front fixed group with a positive focal power, a zooming group with a negative focal power, a compensating group with a positive focal power, and a rear fixed group with a positive focal power are formed sequentially along a light incidence direction, the front fixed group comprises in turn in the light incidence direction: a first lens which is a positive lens, a second lens which is a negative lens, a third lens which is a positive lens, a fourth lens which is a negative lens, a fifth lens which is a positive lens, a sixth lens which is a positive lens and a seventh lens which is a negative lens; the zooming group comprises in turn in the light incidence direction: an eighth lens which is a negative lens, a ninth lens which is a negative lens, a tenth lens which is a positive lens and an eleventh lens which is a positive lens; the compensating group comprises in turn in the light incidence direction: a twelfth lens which is a positive lens, a thirteenth lens which is a negative lens, a fourteenth lens which is a positive lens, a fifteenth lens which is a negative lens, and the diaphragm moving synchronously with the compensating group lenses; the rear fixed group comprises in turn in the light incidence direction: a sixteenth lens which is a negative lens, a seventeenth lens which is a positive lens, an eighteenth lens which is a positive lens, a nineteenth lens which is a negative lens and a twentieth lens which is a positive lens;

wherein, the first lens and the second lens constitute a first double glued structure, the third lens, the fourth lens and the fifth lens constitute a first triple glued structure, the tenth lens and the eleventh lens constitute a second double glued structure, and the thirteenth lens, the fourteenth lens and the fifteenth lens constitute a second triple glued structure.

2. The zoom lens according to claim 1, wherein, the first lens has a first surface convex towards an object direction and a second glued surface convex towards an image direction;

the second lens has a second glued surface concave towards the object direction and a third surface convex towards the image direction;

the third lens has a fourth surface convex towards the object direction and a fifth surface convex towards the image direction;

the fourth lens has a fifth surface concave towards the object direction and a sixth surface concave towards the image direction, wherein the sixth surface is a glued surface;

the fifth lens has a sixth surface convex towards the object direction and a seventh surface concave towards the image direction;

the sixth lens has an eighth surface convex towards the object direction and a ninth surface convex towards the image direction;
the seventh lens has a tenth surface convex towards the object direction and an eleventh surface concave towards the image direction;
the eighth lens has a twelfth surface convex towards the object direction and a thirteenth surface concave towards the image direction;
the ninth lens has a fourteenth surface concave towards the object direction and a fifteenth surface concave towards the image direction;
the tenth lens has a sixteenth surface convex towards the object direction and a seventeenth surface concave towards the image direction;
the eleventh lens has a seventeenth surface convex towards the object direction and an eighteenth surface convex towards the image direction;
the twelfth lens has a nineteenth surface convex towards the object direction and a twentieth surface convex towards the image direction;
the thirteenth lens has a twenty-first surface convex towards the object direction and a twenty-second surface concave towards the image direction;
the fourteenth lens has a twenty-second surface convex towards the object direction and a twenty-third surface convex towards the image direction;
the fifteenth lens has a twenty-third surface concave towards the object direction and a twenty-fourth surface convex towards the image direction;
a diaphragm surface of diaphragm constitutes a twenty-fifth surface;
the sixteenth lens has a twenty-sixth surface concave towards the object direction and a twenty-seventh surface concave towards the image direction;
the seventeenth lens has a twenty-eighth surface convex towards the object direction and a twenty-ninth surface convex towards the image direction;
the eighteenth lens has a thirtieth surface convex towards the object direction and a thirty-first surface convex towards the image direction;
the nineteenth lens has a thirty-second surface concave towards the object direction and a thirty-third surface concave towards the image direction;
the twentieth lens has a thirty-fourth surface convex towards the object direction and a thirty-fifth surface convex towards the image direction.

3. The zoom lens according to claim 2, wherein,
a refractive index and chromatic dispersion of the first lens are respectively in the following ranges: $1.45<n_1<1.70$, and $50<v_1<75$;
a refractive index and chromatic dispersion of the second lens are respectively in the following ranges: $1.45<n_2<1.75$ and $30<v_2<50$;
a refractive index and chromatic dispersion of the third lens are respectively in the following ranges: $1.55<n_3<1.70$ and $40<v_3<65$;
a refractive index and chromatic dispersion of the fourth lens are respectively in the following ranges: $1.60<n_4<1.75$ and $20<v_4<45$;
a refractive index and chromatic dispersion of the fifth lens are respectively in the following ranges: $1.55<n_5<1.75$ and $30<v_5<50$;
a refractive index and chromatic dispersion of the sixth lens are respectively in the following ranges: $1.50<n_6<1.75$ and $35<v_6<50$;
a refractive index and chromatic dispersion of the seventh lens are respectively in the following ranges: $1.65<n_7<1.80$ and $20<v_7<40$;
a refractive index and chromatic dispersion of the eighth lens are respectively in the following ranges: $1.60<n_8<1.75$ and $45<v_8<60$;
a refractive index and chromatic dispersion of the ninth lens are respectively in the following ranges: $1.60<n_9<1.75$ and $45<v_9<60$;
a refractive index and chromatic dispersion of the tenth lens are respectively in the following ranges: $1.45<n_{10}<1.60$ and $50<v_{10}<75$;
a refractive index and chromatic dispersion of the eleventh lens are respectively in the following ranges: $1.65<n_{11}<1.80$ and $20<v_{11}<35$;
a refractive index and chromatic dispersion of the twelfth lens are respectively in the following ranges: $1.65<n_{12}<1.80$ and $25<v_{12}<45$;
a refractive index and chromatic dispersion of the thirteenth lens are respectively in the following ranges: $1.65<n_{13}<1.80$ and $30<v_{13}<50$;
a refractive index and chromatic dispersion of the fourteenth lens are respectively in the following ranges: $1.55<n_{14}<1.70$ and $50<v_{14}<70$;
a refractive index and chromatic dispersion of the fifteenth lens are respectively in the following ranges: $1.50<n_{15}<1.70$ and $30<v_{15}<50$;
a refractive index and chromatic dispersion of the sixteenth lens are respectively in the following ranges: $1.65<n_{16}<1.80$ and $50<v_{16}<60$;
a refractive index and chromatic dispersion of the seventeenth lens are respectively in the following ranges: $1.50<n_{17}<1.70$ and $30<v_{17}<55$;
a refractive index and chromatic dispersion of the eighteenth lens are respectively in the following ranges: $1.60<n_{18}<1.70$ and $35<v_{18}<50$;
a refractive index and chromatic dispersion of the nineteenth lens are respectively in the following ranges: $1.55<n_{19}<1.70$ and $30<v_{19}<50$;
a refractive index and chromatic dispersion of the twentieth lens are respectively in the following ranges: $1.45<n_{20}<1.60$ and $60<v_{20}<80$.

4. The zoom lens according to claim 3, wherein,
the first lens employs a glass material of ZK9 model;
the second lens employs a glass material of N-KZFS11 model;
the third lens employs a glass material of H-ZPK1 model;
the fourth lens employs a glass material of N-KZFS11 model;
the fifth lens employs a glass material of H-ZBAF5 model;
the sixth lens employs a glass material of H-LAF3 model;
the seventh lens employs a glass material of ZF11 model;
the eighth lens employs a glass material of H-LAK67 model;
the ninth lens employs a glass material of H-LAK67 model;
the tenth lens employs a glass material of H-K51 model;
the eleventh lens employs a glass material of H-ZF5 model;
the twelfth lens employs a glass material of H-LAF3 model;
the thirteenth lens employs a glass material of H-LAF62 model;
the fourteenth lens employs a glass material of H-ZPK1 model;

the fifteenth lens employs a glass material of N-KZFS11 model;

the sixteenth lens employs a glass material of H-LAK67 model;

the seventeenth lens employs a glass material of BAF3 model;

the eighteenth lens employs a glass material of BAF4 model;

the nineteenth lens employs a glass material of N-KZFS11 model;

the twentieth lens employs a glass material of H-K9L model.

5. The zoom lens according to claim 1, wherein, surfaces of the first lens to the twentieth lens are spherical surfaces.

6. The zoom lens according to claim 5, wherein a focal distance range of the zoom lens is 750 mm-15 mm.

7. The zoom lens according to claim 6, wherein an F number change range of the zoom lens is 4.78-10.54, wherein the F number is 4.78 when the focal distance is 15 mm, and the F number is 10.54 when the focal distance is 750 mm.

8. The zoom lens according to claim 1, wherein, the optical system of the zoom lens is a continuous zooming system, a total length from the first surface of the first positive lens to the second surface of the twentieth lens is 350 mm, and the total length does not change under any focal distance.

9. The zoom lens according to claim 8, wherein when the focal distance of the zoom lens changes from 15 mm to 750 mm, a range of change of a spacing between the front fixed group and the zooming group is 3.34 mm-137.31 mm; a range of change of a spacing between the zooming group and the compensating group is 207.84 mm-1 mm; a range of change of a spacing between the compensating group and the rear fixed group is 0.77 mm-73.65 mm.

\* \* \* \* \*